US007258279B2

(12) United States Patent
Schneider et al.

(10) Patent No.: US 7,258,279 B2
(45) Date of Patent: Aug. 21, 2007

(54) BIOMETRIC SECURITY SYSTEM AND METHOD

(75) Inventors: John K. Schneider, Snyder, NY (US); Jack C. Kitchens, Tonawanda, NY (US)

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 11/263,264

(22) Filed: Oct. 31, 2005

(65) Prior Publication Data

US 2006/0113380 A1 Jun. 1, 2006

Related U.S. Application Data

(60) Provisional application No. 60/623,918, filed on Nov. 1, 2004.

(51) Int. Cl.
*G06K 7/00* (2006.01)

(52) U.S. Cl. ........................................ 235/486; 235/380

(58) Field of Classification Search ................ 235/380, 235/486; 382/325
See application file for complete search history.

(56) References Cited

U.S. PATENT DOCUMENTS 6,592,031 B1 * 7/2003 Klatt .......................... 235/382
2003/0141959 A1 * 7/2003 Keogh et al. .............. 340/5.53
2005/0111706 A1 * 5/2005 Bohn et al. ................. 382/124

* cited by examiner

*Primary Examiner*—Kimberly D. Nguyen
(74) *Attorney, Agent, or Firm*—Hodgson Russ LLP

(57) ABSTRACT

The invention includes biometric security systems and related methods. In a device according to the invention there is an interface plate, a housing and a biometric receiver. The housing and biometric receiver may be mounted to the interface plate, and the interface plate may be secured to a mounting plate.

24 Claims, 8 Drawing Sheets

BIOMETRIC SECURITY SYSTEM AND METHOD

CROSS-REFERENCE TO RELATED APPLICATION

This application claims the benefit of priority to U.S. provisional patent application Ser. No. 60/623,918, filed on Nov. 1, 2004.

FIELD OF THE INVENTION

The present invention relates to devices for and methods of providing biometric information.

BACKGROUND OF THE INVENTION

Since the 1800's fingerprint information has been collected from human fingers and hands by means of ink and paper. For purposes of this document, the term "fingerprint" is used to mean the skin surface friction ridge detail of a portion of a hand, such as a single fingerprint, or the entire hand. Fingerprints are an example of a biometric that may be used to identify individuals. Other biometrics that are used to identify individuals are hand geometry, voice, iris, retina and facial characteristics.

In recent years various electronic fingerprint scanning systems have been developed utilizing optical, capacitance, direct pressure, thermal and ultrasonic methods. Methods based on ultrasound have proven to be highly accurate, since they are insulated from the effects of grease, dirt, paint, ink and other image contaminants. Fingerprint scanning systems are now appearing in places where ink-and-paper identification methods would be undesirable. Since fingerprint scanners are easy to use and do not leave messy ink on the person being identified, fingerprint scanners are being used to identify individuals in many situations. For example, it is now common to find biometric scanners being used in security systems to identify authorized individuals. Some of these security systems determine whether an individual is authorized to enter a building by scanning the individual's fingerprint to obtain a biometric sample, and then compare that biometric sample to fingerprint samples stored in a database and which are known to have come from authorized individuals. Upon finding a matching sample in the database, the individual may be allowed to enter the building.

To allow greater use of biometric scanners, the biometric scanners must often be installed in new or existing facilities. There is a need to prevent a biometric scanner from being removed from an installation. Consequently, there is a need for a biometric security system that can be fixed to new or existing facilities.

SUMMARY OF THE INVENTION

The present invention includes devices and methods. One such device is a security system having an interface plate, a housing and a biometric receiver. The interface plate may have a southerly orifice and a northerly orifice. A tab may extend from a location adjacent to the northerly orifice. The housing may be mounted to the interface plate, and the tab may be received inside the housing. The biometric receiver, such as an ultrasonic fingerprint scanner, may be mounted to the interface plate.

A method according to the invention may provide a security system. In one such method, an interface plate, housing and biometric receiver may be provided. The interface plate, housing and biometric receiver may be similar to those described in the preceding paragraph. The housing may be mounted to the interface plate in a manner so that the tab is received in the housing. The biometric receiver may also be mounted to the interface plate. In this manner, a security system may be provided as a single unit, and may be easily attached to a mounting plate, which is fixed to a new or old facility.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
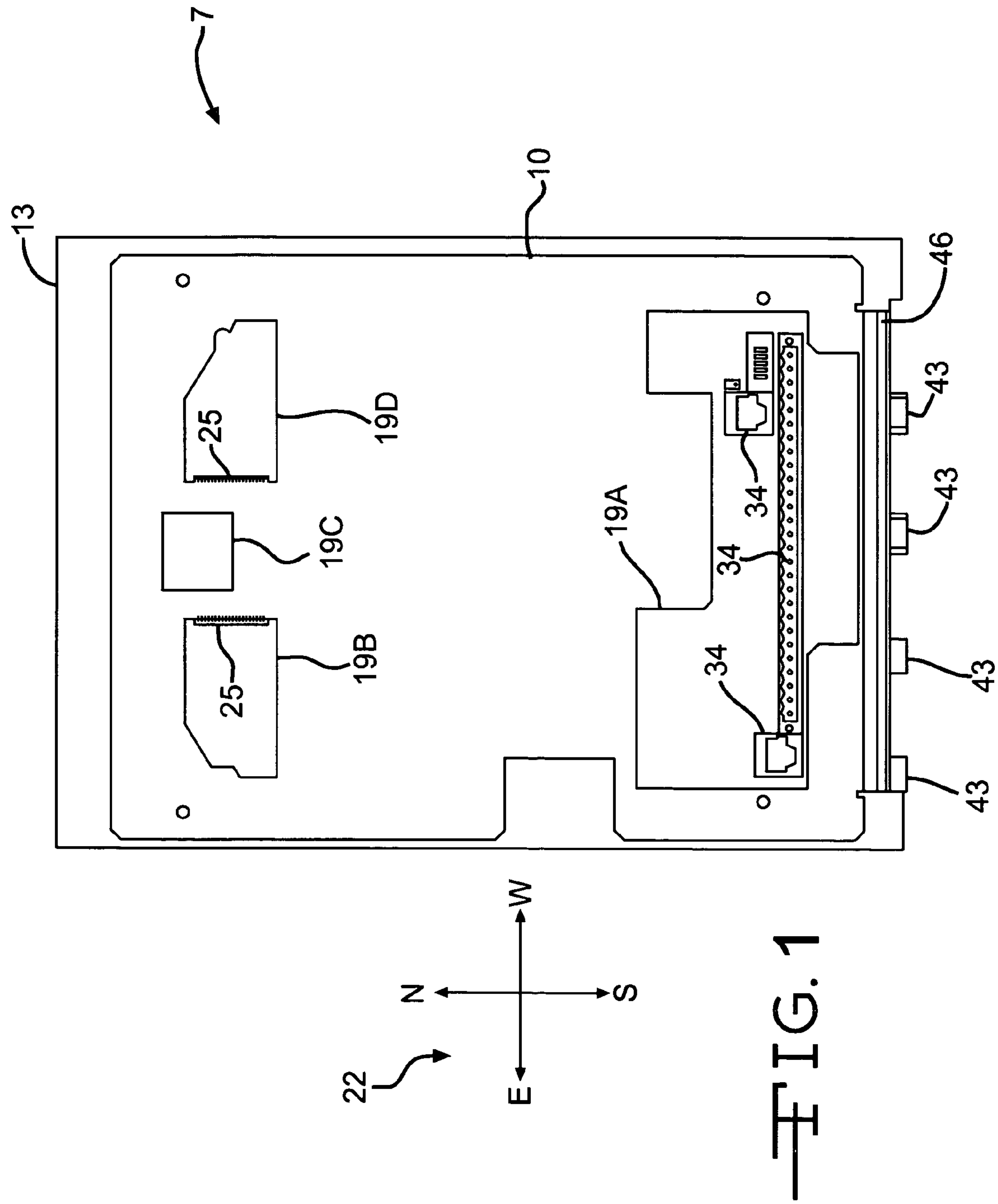
FIG. 1, which is a rear view of a security system according to the invention.
Figure 2:
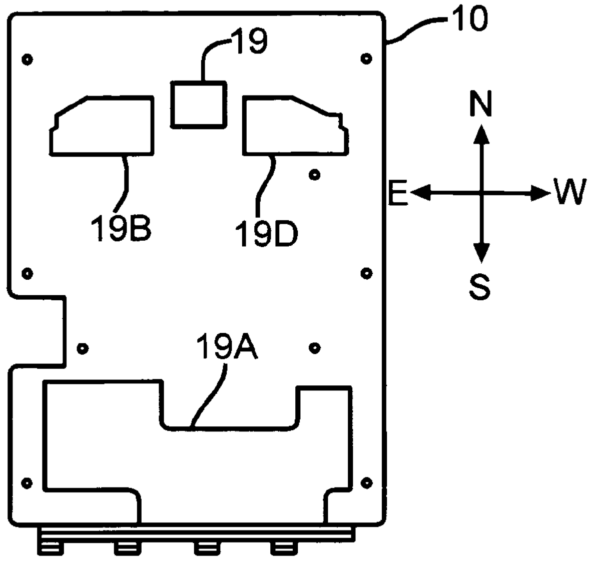
FIG. 2, which depicts an interface plate according to the invention.
Figure 3:
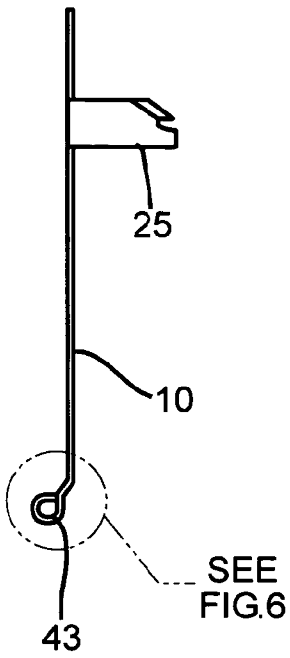
FIG. 3, which is a side view of the interface plate depicted in FIG. 2.
Figure 4:
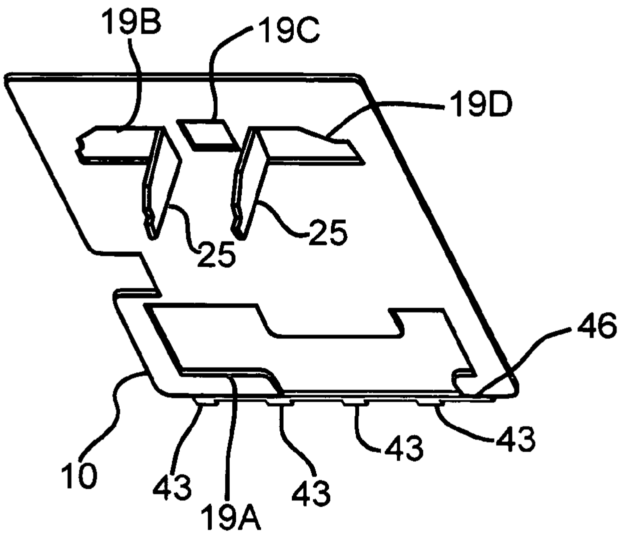
FIG. 4, which is perspective view showing a first side of the interface plate.
Figure 5:
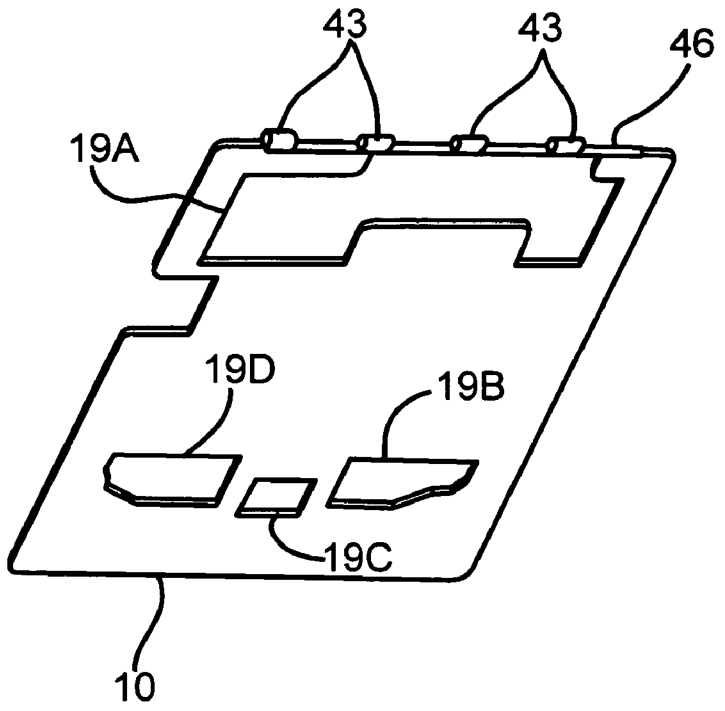
FIG. 5, which is a perspective view showing a second side of the interface plate.
Figure 6:
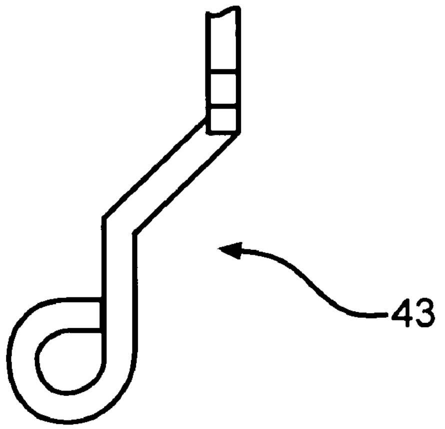
FIG. 6, which is an enlarged portion of part of the interface plate depicted in FIG. 3.
Figure 8:
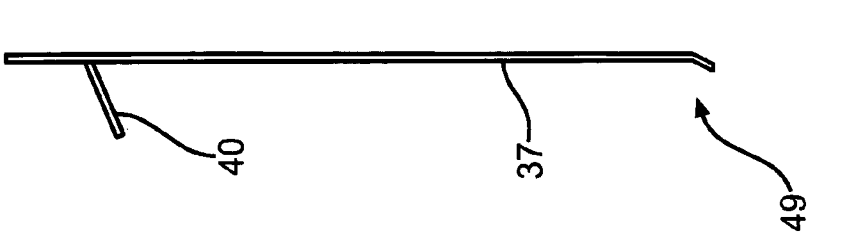
FIG. 8, which is a side view of the mounting plate depicted in FIG. 7.
Figure 7:
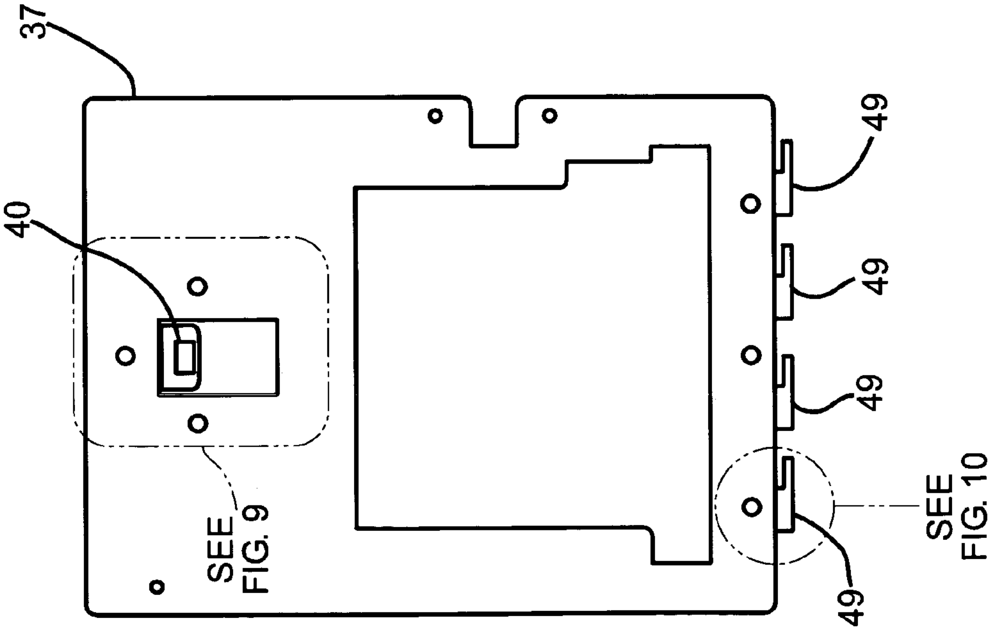
FIG. 7, which depicts a mounting plate according to the invention.
Figure 9:
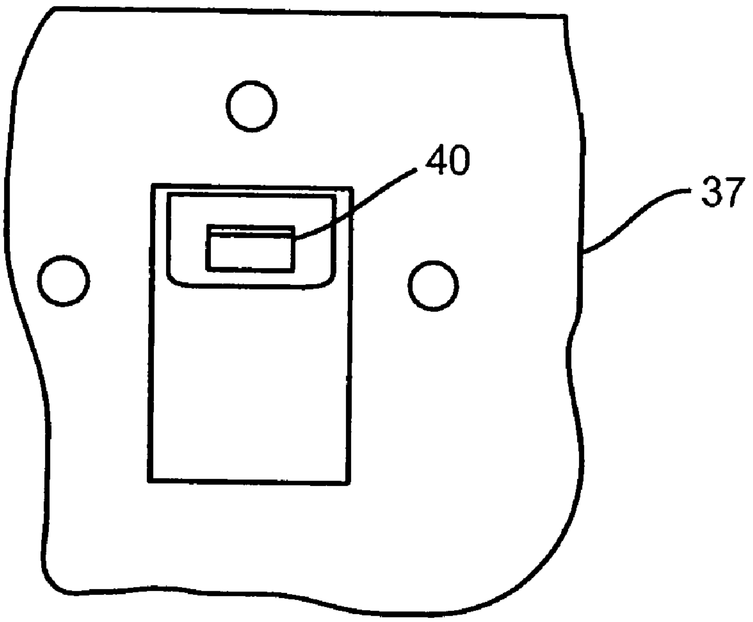
FIG. 9, which is an enlarged portion of part of the mounting plate depicted in FIG. 7.
Figure 10:
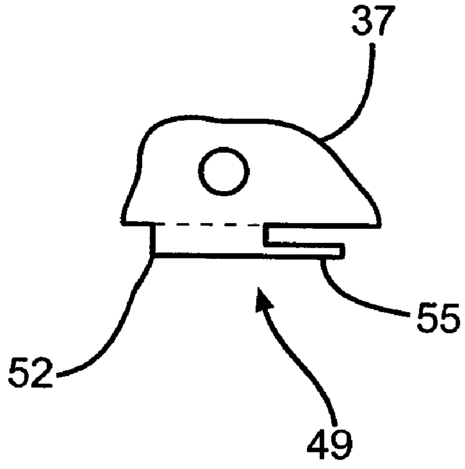
FIG. 10, which is an enlarged portion of part of the mounting plate depicted in FIG. 7.
Figure 11:
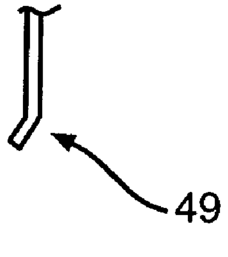
FIG. 11, which is a side view of the portion depicted in FIG. 10.
Figure 13:
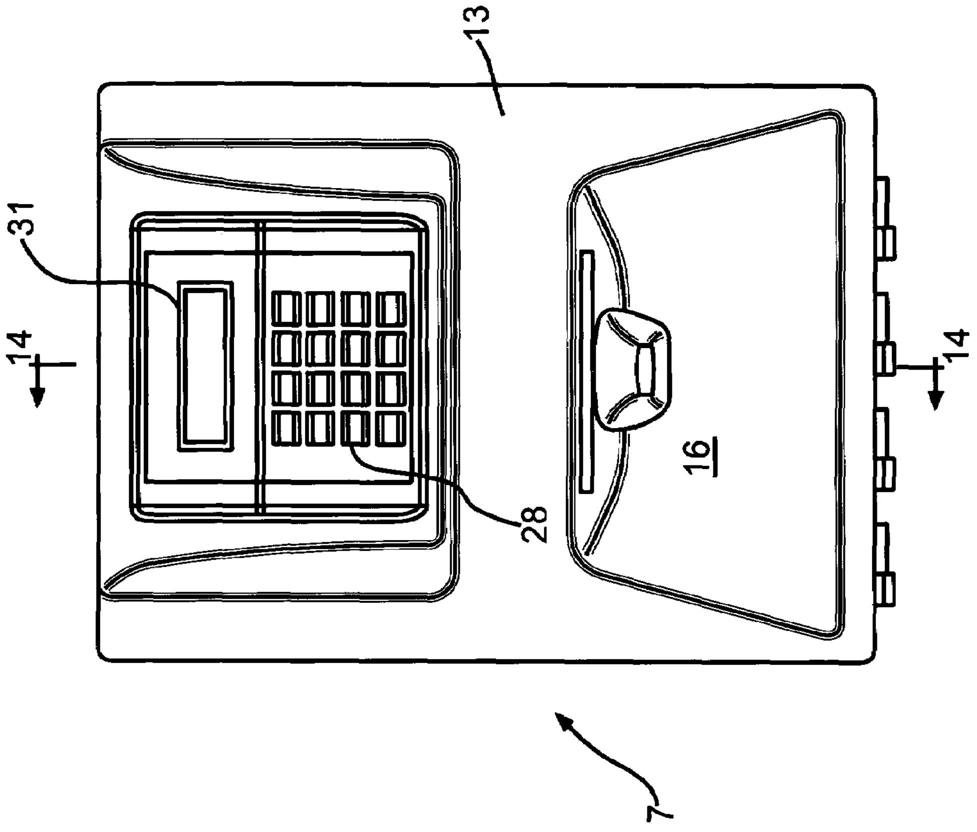
FIG. 13, which is a front view of a security system according to the invention.
Figure 12:
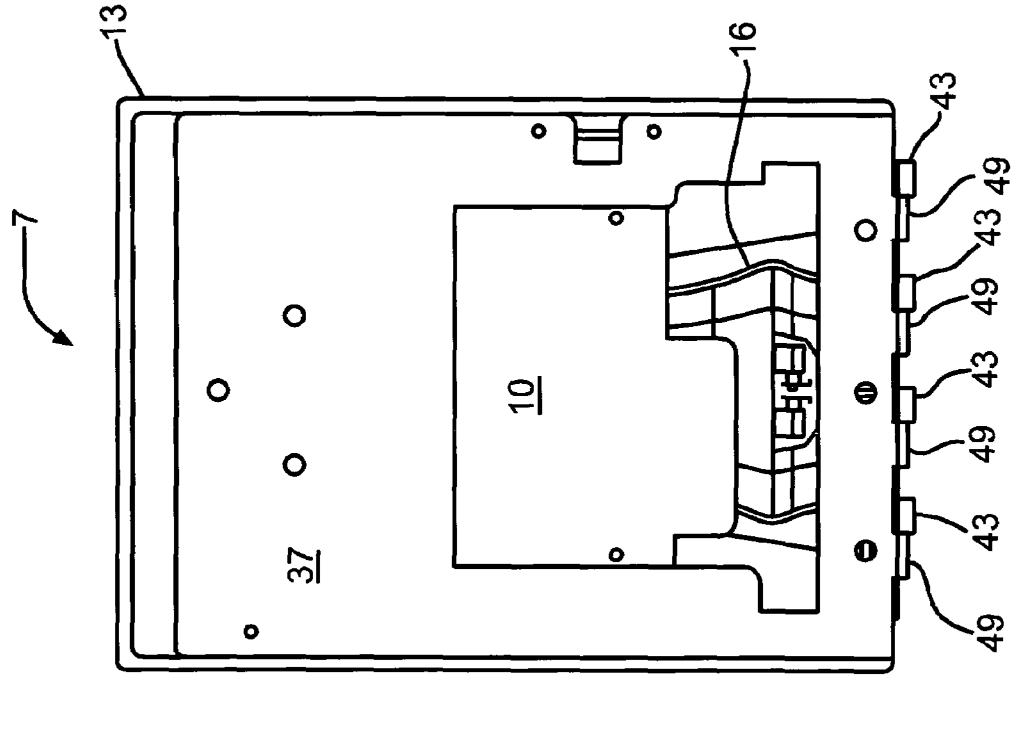
FIG. 12, which shows the interface plate with the biometric receiver mounted thereto.
Figure 14:
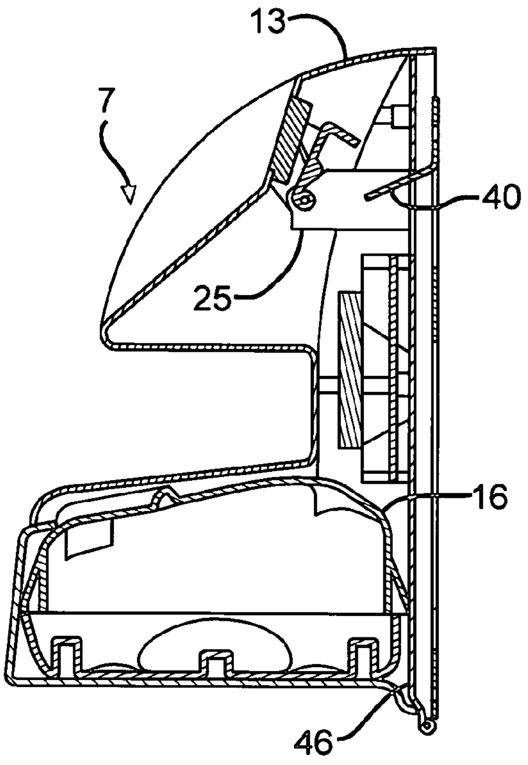
FIG. 14, which is a cross-sectional side view of the security system taken along the line A-A in FIG. 13.
Figure 15:
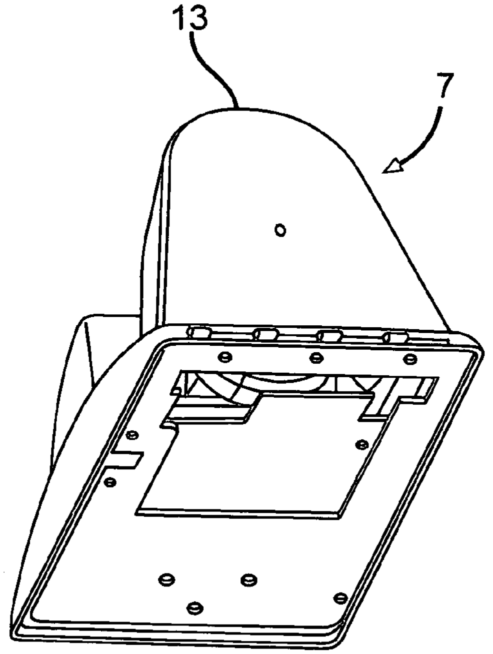
FIG. 15, which is a perspective view of the security system viewed from a first direction.
Figure 16:
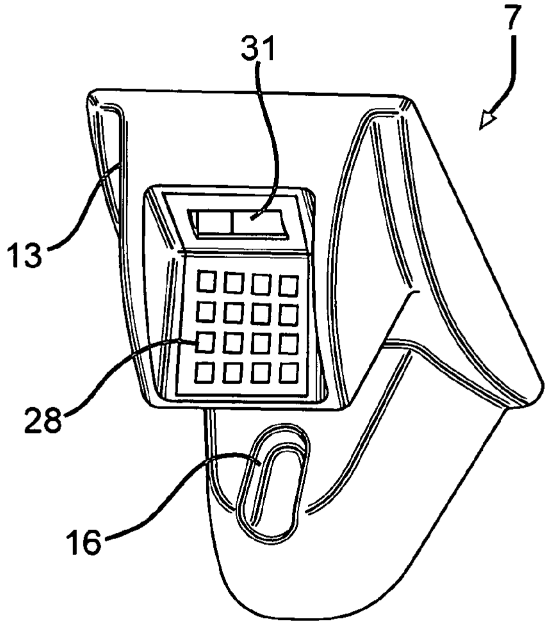
FIG. 16, which is a perspective view of the security system viewed from a second direction.

The invention may be embodied as a security system 7 that has an interface plate 10, a housing 13 and a biometric receiver 16. FIG. 1 depicts such a system 7. In FIG. 1 there is shown an interface plate 10 that has at least two orifices 19. FIGS. 2 through 5 also show the interface plate 10. Certain features of the embodiments of the invention are described herein with reference to a hypothetical compass arrangement 22, which is intended to give the reader an idea as to where features may be located relative to each other, or how certain components may be used relative to each other. Use of the compass arrangement 22 is not intended to indicate that the features or certain actions are in fact geographically north, south, east or west. The interface plate 10 may have a southerly orifice 19A and one or more northerly orifices 19B, 19C, 19D.

The interface plate 10 may have a tab 25 extending from a location adjacent to each of the northerly orifices 19B, 19D. The housing 13 may be mounted to the interface plate 10 in such a manner so that the tabs 25 are received inside the housing 13. Each tab 25 may be used to support the weight of the housing 13 and may provide a mechanical connection with the housing 10 or components of the security system 7, such as a keypad 28 and/or display 31, in order to hold the housing 10 and other components to the interface plate 10. The biometric receiver 16 may also be mounted to the interface plate 10. The housing 13 and the biometric receiver 16 may be mounted to the interface plate 10 by use of screws.

One or more of the tabs 25 may be shaped similarly to its adjacent northerly orifice 19B, 19D. Such a tab 25 may be an integral portion of the interface plate 10, for example, the tab 25 may be formed by cutting the interface plate 10 and then bending the tab 25 so as to create the first northerly orifice 19B and an adjacent tab 25.

In an embodiment of the invention, electrical conduits 34 may extend through the southerly orifice 19A. For example, the electrical conduits 34 may allow for sending information from the biometric receiver 16 to a computer, which is capable of processing the information and determining whether a biometric sample scanned by the biometric receiver 16 belongs to an authorized individual. Such conduits 34 may be configured to allow for communications according to RS-422 or RS-485. Other conduits 34 may allow for sending signals from the keypad 28 or to the display 31, or the delivery of electricity to the biometric receiver 16, the keypad 28 or the display 31.

The interface plate 10 may be secured to a mounting plate 37. One such mounting plate 37 is depicted in FIGS. 7 through 11. The mounting plate 37 may be connected to a wall. An arm 40 may extend from the mounting plate 37, and may be used to extend through one of the northerly orifices 19C of the interface plate 10. The arm 40 may contact an edge of the interface plate 10 that defines a boundary of the northerly orifice 19C, in order to hold the interface plate 10 to the mounting plate 37.

To secure the interface plate 10 to the mounting plate 37, the interface plate 10 may have one or more hinge portions 43 positioned proximate to an edge 46 of the southerly orifice 19A. For example, the hinge portions 43 may be formed along a southerly edge 46 of the interface plate 10. The hinge portions 43 of the interface plate 10 may be an integral part of the interface plate 10, and may be formed by bending a portion of the interface plate 10 into a shape such as that depicted in FIG. 3.

The mounting plate 37 may have a hinge component 49 that is matable with the hinge portion 43 of the interface plate 10. The hinge component 49 may have a base portion 52 and a post portion 55. The base portion 52 may be connected to the mounting plate 37 and the post portion 55. The base portion 52 may serve to space the post portion 55 from the mounting plate 37. In this manner, the hinge portion 43 may receive the post portion 55, and thereby hold the interface plate 10 to the mounting plate 37.

Figure 17:
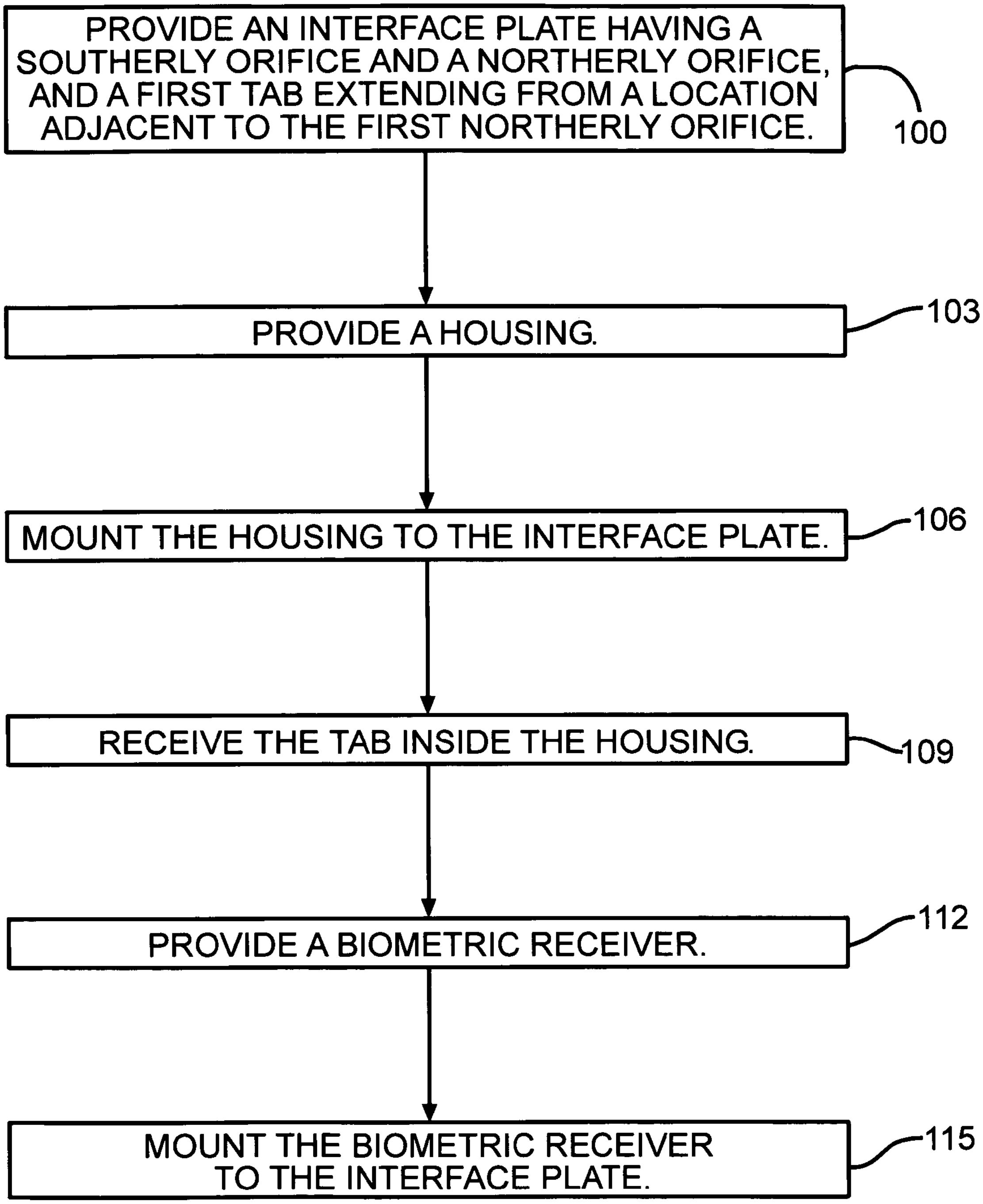
FIG. 17, which depicts steps of a method according to the invention.

The invention may be embodied as a method. FIG. 17 depicts one such method. In that method, an interface plate may be provided 100. The interface plate may have a southerly orifice and a northerly orifice. A tab may extend from a location adjacent to the northerly orifice. A housing may be provided 103 and mounted 106 to the interface plate. In conjunction with mounting 106 the housing to the interface plate, the tab may be received 109 in the housing. A biometric receiver may be provided 112 and mounted 115 to the interface plate. The biometric receiver may be mounted 115 to the interface plate so that electrical conduits associated with the biometric receiver are allowed to pass through the southerly orifice.

Such a method may be carried out by providing a mounting plate having a hinge component that is matable with a hinge portion on the interface plate. Part of the hinge component may be inserted into the hinge portion of the interface plate, thereby causing the interface plate to mate with the mounting plate. For example, the hinge portion of the interface plate may be positioned next to a post of the hinge component, and then the interface plate may be moved in an easterly or westerly direction so that the hinge portion surrounds the post. To provide additional stability, an arm of the mounting plate may be inserted through a northerly orifice of the interface plate. The arm may be angled so as to contact an edge of the interface plate.

U.S. provisional patent application No. 60/623,918 discloses additional details about the invention and additional embodiments of the invention. The disclosure of that patent application is incorporated by this reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A security system, comprising:

an interface plate having therethrough a southerly orifice and a first northerly orifice, and a first tab extending from a location adjacent to the first northerly orifice;

a housing mounted to the interface plate, and receiving the tab inside the housing;

a biometric receiver mounted to the interface plate; and a second northerly orifice and a second tab extending from the interface plate from a location adjacent to the second northerly orifice.

2. The security system of claim 1, wherein the first tab is shaped similarly to the first northerly orifice.

3. The security system of claim 1, wherein the first tab is an integral portion of the interface plate.

4. The security system of claim 1, further comprising signal conduits extending through the southerly orifice.

5. The security system of claim 1, further comprising a hinge portion positioned proximate to an edge of the southerly orifice.

6. The security system of claim 5, wherein the hinge portion is an integral part of the interface plate.

7. The security system of claim 5, further comprising a mounting plate having a hinge component that is matable with the hinge portion.

8. The security system of claim 7, wherein the hinge component includes a base portion and a post portion, the base portion being connected to the mounting plate and the post, and the base portion serving to space the post from the mounting plate.

9. The security system of claim 8, wherein the post is matable with the hinge portion of the interface plate.

10. A method of providing a security system, comprising:

providing an interface plate having therethrough a southerly orifice and a first northerly orifice, and a first tab extending from a location adjacent to the first northerly orifice;

providing a housing;

mounting the housing to the interface plate;

receiving the tab inside the housing;

providing a biometric receiver;

mounting the biometric receiver to the interface plate;

providing a mounting plate having a hinge component that is matable with the interface plate; and mating the interface plate with the mounting plate.

11. The method of claim 10, wherein mounting the biometric receiver includes mounting the biometric receiver such that electrical conduits associated with the biometric receiver are allowed to pass through the southerly orifice.

12. The method of claim 10, wherein mating the interface plate with the mounting plate includes placing the interface plate proximate to the mounting plate and moving the interface plate in an easterly or westerly direction.

13. A security system, comprising:

an interface plate having therethrough a southerly orifice and a first northerly orifice, and a first tab extending from a location adjacent to the first northerly orifice;

a housing mounted to the interface plate, and receiving the tab inside the housing;

a biometric receiver mounted to the interface plate; and a hinge portion positioned proximate to an edge of the southerly orifice, wherein the hinge portion is an integral part of the interface plate.

14. The security system of claim 13, wherein the first tab is shaped similarly to the first northerly orifice.

15. The security system of claim 13, wherein the first tab is an integral portion of the interface plate.

16. The security system of claim 13, further comprising a second northerly orifice and a second tab extending from the interface plate from a location adjacent to the second northerly orifice.

17. The security system of claim 13, further comprising signal conduits extending through the southerly orifice.

18. The security system of claim 13, further comprising a mounting plate having a hinge component that is matable with the hinge portion.

19. A security system, comprising:

an interface plate having therethrough a southerly orifice and a first northerly orifice, and a first tab extending from a location adjacent to the first northerly orifice;

a housing mounted to the interface plate, and receiving the tab inside the housing;

a biometric receiver mounted to the interface plate;

a hinge portion positioned proximate to an edge of the southerly orifice; and a mounting plate having a hinge component that is matable with the hinge portion.

20. The security system of claim 19, wherein the first tab is shaped similarly to the first northerly orifice.

21. The security system of claim 19, wherein the first tab is an integral portion of the interface plate.

22. The security system of claim 19, further comprising a second northerly orifice and a second tab extending from the interface plate from a location adjacent to the second northerly orifice.

23. The security system of claim 19, further comprising signal conduits extending through the southerly orifice.

24. The security system of claim 19, wherein the hinge portion is an integral part of the interface plate.

* * * * *